United States Patent Office 2,915,548
Patented Dec. 1, 1959

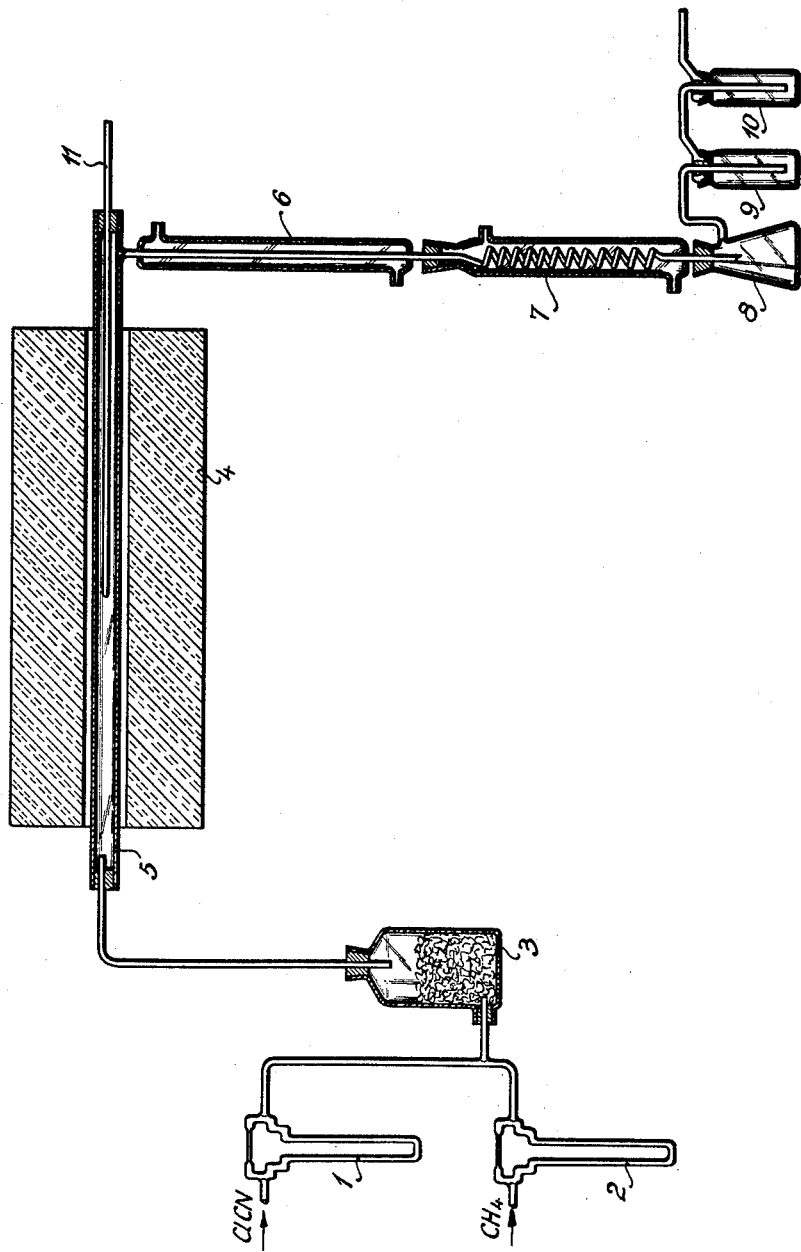

2,915,548

PRODUCTION OF NITRILES

Karlheinz Andres, Aachen, Germany, assignor to Ruhrchemie Aktiengesellschaft, Oberhausen-Holten, Germany, a corporation of Germany Application February 5, 1957, Serial No. 638,323

Claims priority, application Germany February 13, 1956

1 Claim. (Cl. 260—465.3)

This invention relates to, and has as its object, the production of nitriles.

In accordance with the invention, it has been found that nitriles are formed by heating gaseous mixtures of cyanogen chloride and a saturated aliphatic hydrocarbon at a temperature between about 600 and 900° C. The reaction proceeds as follows:

$$RH + ClCN \rightarrow RCN + HCl$$

in which R is a saturated aliphatic hydrocarbon radical, and preferably a lower saturated aliphatic hydrocarbon, RH representing an alkane and preferably a lower alkane.

It is of particular advantage to effect the reaction using methane as the alkane in which connection it is preferable to use a reaction temperature of about 850° C. This reaction proceeds in accordance with the following equation:

$$CH_4 + ClCN \rightarrow CH_3CN + HCl$$

The relative quantities of the reactants are preferably chosen so that there are about 3 to 5 parts by volume of alkane, such as methane, per part by volume of cyanogen chloride. The heating is preferably effected in a tube of quartz glass or other inert and sufficiently heat resistant material. The reaction proceeds at a relatively high rate and with a continuous passage of the gas mixture, a residence time in the reaction zone of 0.5–5 seconds is generally sufficient.

The resulting nitrile formed, such as the acetonitrile in the case of methane, reacts to a small extent with further amounts of cyanogen chloride with the formation of malononitrile in accordance with the following equation:

$$CH_3CN + ClCN \rightarrow CH_2(CN)_2 + HCl$$

When using higher alkanes than methane it is preferable to operate at somewhat lower temperatures. Thus, for example, when reacting gaseous propane and cyanogen chloride with about 3 parts by volume of propane per part by volume of cyanogen chloride, reaction temperatures of about 700° C. are preferred. This results in the formation of a reaction product consisting of isomeric butyronitriles which may be liquified by cooling. In addition, as by-product, unsaturated and chlorine containing compounds along with hydrogen chloride are formed.

When, for example, using butane as the alkane, it is preferable to effect the reaction at a temperature of about 650° C. using a mixture ratio of about 3 parts by volume butane by part by volume of cyanogen chloride. This reaction mainly results in the formation of isomeric valeronitriles and in addition of unsaturated and chlorine containing compounds and hydrogen chloride as a gaseous by-product.

The invention will be described in further detail with reference to the accompanying drawing which diagrammatically shows an embodiment of an apparatus set up for effecting the reaction in accordance with the invention.

The cyanogen chloride is introduced by means of a flow meter 1 and the alkane, as for example methane, by means of the flow meter 2, both these gases being mixed in the vessel 3 which may contain filling bodies. The mixture is then passed to an electrically heated furnace 4 which contains a quartz glass tube 5 which is heated to the desired reaction temperature.

After leaving the reaction tube 5, the hot reaction gas mixture flows through a Liebig condenser 6 and then through a spiral condenser 7, into the flask 8 in which the liquified reaction product condenses. The upper portion of the flask 8 is connected to a condensing device 9 which in turn is connected to a series of wash bottles 10. Though only one wash bottle is shown, for the sake of simplicity, there are generally used a number of series-connected wash bottles as, for example, five such wash bottles which contain water and/or an alkaline solution, as for example, a sodium hydroxide solution to absorb the hydrogen chloride formed.

The reaction temperature within the quartz tube 5 may be controlled by a thermo-sensitive element such as the thermocouple 11 so that the optimum reaction temperature is maintained within the tube.

The capacity of the electric furnace 4 is, for example, 1500 watts with a voltage of 50 volts produced by a suitable transformer. The quartz tube 5 may, for example, have a diameter of about 2 cm. and a heating zone length of about 60 cm.

The following example is given by way of illustration and not limitation.

*Example*

In the device shown in the drawing, 40 gms. of methane (2.5 mols) and 51.2 gms. of cyanogen chloride (0.833 mol) were passed through the quartz tube 5 within 80 minutes. These quantities corresponded to a mixing proportion of 3 parts by volume of methane per part by volume of cyanogen chloride in the gaseous state. The reaction temperature was maintained at about 850° C. by means of the electric heating device. The flow velocity was adjusted so that the residence time of the gas mixture in the reaction zone was 1.21 seconds. Acetonitrile in amount of 12.7 grams (0.309 mol) could be separated as the final product within 80 minutes in the collecting vessel 8. A 37% conversion of the cyanogen chloride charged was obtained. Hydrogen chloride in amount of 20.1 grams (0.556 mol) was obtained as by-product.

I claim:

Process for the production of acetonitrile by heating a mixture of cyanogen chloride and methane in the gaseous phase at elevated temperatures which comprises effecting said heating by continuously passing the gas mixture containing about 3–5 parts by volume of methane to one part by volume of cyanogen chloride through a heated reaction zone maintained at a temperature of about 850° C. with a residence time of between about 0.5 and 5 seconds, and recovering the acetonitrile formed by cooling the reaction mixture.

References Cited in the file of this patent

UNITED STATES PATENTS

| | | |
|---|---|---|
| 2,553,404 | Dixon | May 15, 1951 |
| 2,553,406 | Dixon | May 15, 1951 |

FOREIGN PATENTS

| | | |
|---|---|---|
| 848,947 | Germany | Sept. 11, 1952 |

OTHER REFERENCES

Thompson: Trans. Faraday Soc., vol. 37, 344–52 (1941), p. 352 relied on.